US010161651B2

(12) United States Patent
Kojima

(10) Patent No.: US 10,161,651 B2
(45) Date of Patent: Dec. 25, 2018

(54) AIR CONDITIONING APPARATUS

(71) Applicant: DAIKIN INDUSTRIES, LTD., Osaka-shi, Osaka (JP)

(72) Inventor: Akiharu Kojima, Sakai (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 15/113,771

(22) PCT Filed: Jan. 20, 2015

(86) PCT No.: PCT/JP2015/051405
§ 371 (c)(1),
(2) Date: Jul. 22, 2016

(87) PCT Pub. No.: WO2015/115251
PCT Pub. Date: Aug. 6, 2015

(65) Prior Publication Data
US 2016/0377312 A1 Dec. 29, 2016

(30) Foreign Application Priority Data
Jan. 28, 2014 (JP) .................. 2014-013429

(51) Int. Cl.
F24F 11/77 (2018.01)
F24F 1/00 (2011.01)
(Continued)

(52) U.S. Cl.
CPC ............ F24F 11/77 (2018.01); F24F 1/0003 (2013.01); F24F 11/76 (2018.01); F24F 11/46 (2018.01); F24F 2110/12 (2018.01)

(58) Field of Classification Search
CPC ...... F24F 11/04; F24F 11/053; F24F 11/0076; F24F 11/0079; F24F 2011/0013;
(Continued)

(56) References Cited

U.S. PATENT DOCUMENTS 4,364,237 A   12/1982 Cooper et al.
5,630,325 A    5/1997 Bahel et al.
(Continued)

FOREIGN PATENT DOCUMENTS

JP    5-164391 A    6/1993
JP    5-280796 A   10/1993
(Continued)

OTHER PUBLICATIONS

International Search Report of corresponding PCT Application No. PCT/JP2015/051405 dated Apr. 21, 2015.
(Continued)

Primary Examiner — Len Tran
Assistant Examiner — Hans Weiland
(74) Attorney, Agent, or Firm — Global IP Counselors, LLP

(57) ABSTRACT

An air conditioning apparatus includes an outdoor unit and an indoor unit having an indoor heat exchanger and an indoor fan. An airflow rate setting of the indoor fan can be manually instructed. An indoor airflow rate limitation control useable to forcibly limit the airflow rate setting of the indoor fan to be nearer to a low airflow rate in accordance with an outside air temperature is carried out with the airflow rate setting of the indoor fan having been manually instructed.

8 Claims, 7 Drawing Sheets

(51) Int. Cl.
*F24F 11/76* (2018.01)
*F24F 110/12* (2018.01)
*F24F 11/46* (2018.01)

(58) Field of Classification Search
CPC ............. F24F 2011/0075; F24F 1/0003; F25B 49/025; F25B 2313/0293
See application file for complete search history.

(56) References Cited

U.S. PATENT DOCUMENTS

| | | | | |
|---|---|---|---|---|
| 5,634,346 | A * | 6/1997 | Ramakrishnan | F24F 11/006 62/179 |
| 6,907,745 | B2 * | 6/2005 | Turner | F25B 13/00 62/160 |
| 2003/0010047 | A1 | 1/2003 | Shimoda | |
| 2003/0225542 | A1 * | 12/2003 | Liu | F04D 27/004 702/132 |
| 2005/0257539 | A1 * | 11/2005 | Lee | F24F 11/0079 62/180 |
| 2009/0266091 | A1 * | 10/2009 | Tolbert, Jr. | F25B 49/025 62/115 |
| 2011/0138830 | A1 * | 6/2011 | Unagida | F24F 11/0079 62/186 |
| 2012/0053738 | A1 * | 3/2012 | Lingrey | F24F 11/0012 700/278 |

FOREIGN PATENT DOCUMENTS

| | | |
|---|---|---|
| JP | 2002-147823 A | 5/2002 |
| JP | 2003-106612 A | 4/2003 |
| JP | 2011-252655 A | 12/2011 |
| JP | 5846226 B2 | 1/2016 |

OTHER PUBLICATIONS

International Preliminary Report of corresponding PCT Application No. PCT/JP2015/051405 dated Aug. 11, 2016.
European Search Report of corresponding EP Application No. 15 74 3329.3 dated Oct. 17, 2017.

* cited by examiner

AIR CONDITIONING APPARATUS

CROSS-REFERENCE TO RELATED APPLICATIONS

This U.S. National stage application claims priority under 35 U.S.C. § 119(a) to Japanese Patent Application No. 2014-013429, filed in Japan on Jan. 28, 2014, the entire contents of which are hereby incorporated herein by reference.

TECHNICAL FIELD

The present invention relates to an air conditioning apparatus, and particularly to an air conditioning apparatus in which the airflow rate setting of an indoor fan can be manually instructed.

BACKGROUND ART

In the prior art, there are air conditioning apparatuses that have an outdoor unit and an indoor unit, and that control compressor capacity so that the evaporation temperature of the refrigerant during an air-cooling operation or the condensing temperature of the refrigerant during an air-warming operation reaches a target evaporation temperature or a target condensing temperature. An example of such an air conditioning apparatus is one that varies the target evaporation temperature and/or the target condensing temperature in accordance with the outside air temperature as shown in Japanese Laid-open Patent Application No. 2002-147823.

SUMMARY

In the air conditioning apparatus of Japanese Laid-open Patent Application No. 2002-147823, the capacity of the compressor is regulated while the target evaporation temperature and/or the target condensing temperature is varied in accordance with the outside air temperature, and the power consumption of the compressor can therefore be reduced. It is thereby possible to improve the annual performance factor (APF) by reducing the power consumption of the compressor.

However, in the air conditioning apparatus of Japanese Laid-open Patent Application No. 2002-147823, when the airflow rate setting of the indoor fan in the indoor unit has been manually instructed using remote control or the like, the manually instructed airflow rate setting is maintained even when the airflow rate is unnecessarily high. Therefore, the indoor fan wastefully consumes power, and the improvement in the APF is liable to be insufficient.

An object of the present invention is to reduce wasteful power consumption by an indoor unit and enhance the APF in an air conditioning apparatus in which the airflow rate setting of the indoor fan can be manually instructed.

An air conditioning apparatus according to a first aspect of the present invention comprises an outdoor unit, and an indoor unit having an indoor heat exchanger and an indoor fan, an airflow rate setting of the indoor fan being capable of being manually instructed. In this configuration, an indoor airflow rate limitation control for forcibly limiting the airflow rate setting of the indoor fan to be nearer to a low airflow rate in accordance with an outside air temperature is carried out with the airflow rate setting of the indoor fan having been manually instructed.

In the aforedescribed aspect, as noted above, the indoor airflow rate limitation control is carried out with the airflow rate setting of the indoor fan having been manually instructed, thereby making it possible to forcibly reduce the airflow rate of the indoor fan when the airflow rate of the indoor fan is unnecessarily high in view of the outside air temperature.

In this case, wasteful power consumption of the indoor fan can thereby be reduced and the APF enhanced.

An air conditioning apparatus according to a second aspect of the present invention is the air conditioning apparatus according to the first aspect of the present invention, wherein the outdoor unit or the indoor unit has an indoor flow rate regulation valve for regulating a flow rate of a refrigerant that flows through the indoor heat exchanger. The indoor airflow rate limitation control is carried out when a valve opening of the indoor flow rate regulation valve is equal to or less than a permitted valve opening for limiting the airflow rate.

When an indoor air-conditioning load is high, limiting the airflow rate setting of the indoor fan to be nearer to the low airflow rate makes it difficult to process the indoor air-conditioning load even when the airflow rate of the indoor unit is considerable in consideration of the outside air temperature. Therefore, the indoor airflow rate limitation control is carried out is not preferred in such a case. Also, when the indoor air-conditioning load is high, the flow rate of the refrigerant that flows through the indoor heat exchanger tends to be increasing.

In view of this situation, it is determined whether the indoor air-conditioning load is high according to the valve opening of the indoor flow rate regulation valve, which increases in accompaniment with an increase in the flow rate of the refrigerant that flows through the indoor heat exchanger, as described above.

The indoor airflow rate limitation control can be appropriately carried out, with consideration given not just to the outside air temperature, but also to the indoor air-conditioning load.

An air conditioning apparatus according to a third aspect of the present invention is the air conditioning apparatus according to the first or second aspect of the present invention, wherein an upper limit of the airflow rate of the indoor fan being capable of being modified in accordance with the outside air temperature is provided. The indoor airflow rate limitation control is carried out by reducing the upper limit of the airflow rate of the indoor fan.

An air conditioning apparatus according to a fourth aspect of the present invention is the air conditioning apparatus according to the third aspect of the present invention, wherein the upper limit of the airflow rate of the indoor fan is reduced in accordance with a decrease in the outside air temperature during an air-cooling operation, and/or the upper limit of the airflow rate of the indoor fan is reduced in accordance with an increase in the outside air temperature during an air-warming operation.

In the aforedescribed aspect, the indoor airflow rate limitation control is carried out by providing the upper limit to the airflow rate of the indoor fan, as described above, and the airflow rate setting of the indoor fan can therefore be forcibly reduced to the upper limit of the airflow rate when the manually instructed airflow rate setting of the indoor fan is at a higher airflow rate than the upper limit of the airflow rate. On the other hand, when the manually instructed airflow rate setting of the indoor fan is an airflow rate that is equal to or less than the upper limit of the airflow rate, the airflow rate setting of the indoor fan can be kept unchanged at the manually instructed airflow rate setting of the indoor fan.

In the aforedescribed aspect, the indoor airflow rate limitation control can thereby be carried out while the manually indicated airflow rate setting of the indoor fan is maintained to the extent possible.

An air conditioning apparatus according to a fifth aspect of the present invention is the air conditioning apparatus according to any of the first to fourth aspects of the present invention, wherein the limitation of the airflow rate setting of the indoor fan to be nearer to the low airflow rate is relaxed when the indoor temperature diverges from a target indoor temperature.

When the indoor air-conditioning load increases or a change otherwise occurs in the operating conditions while the indoor airflow rate limitation control is carried out, the indoor temperature may diverge from the target indoor temperature, and the airflow rate setting of the indoor fan is therefore preferably not kept excessively limited to be nearer to the low airflow rate in this case.

In view of this situation, the limitation of the airflow rate setting of the indoor fan to be nearer to the low airflow rate is relaxed when the indoor temperature diverges from the target indoor temperature as described above.

The indoor airflow rate limitation control can be suitably performed with consideration given to not only the outside air temperature, but also to variation in the indoor temperature.

DESCRIPTION OF EMBODIMENTS

An embodiment of the air conditioning apparatus according to the present invention is described below with reference to the drawings. The specific configuration of the embodiments of the air conditioning apparatus according to the present invention is not limited to the embodiment and modifications thereof described below, and modifications are possible within a range that does not depart from the scope of the invention.

(1) Basic Configuration of the Air Conditioning Apparatus

Figure 1:
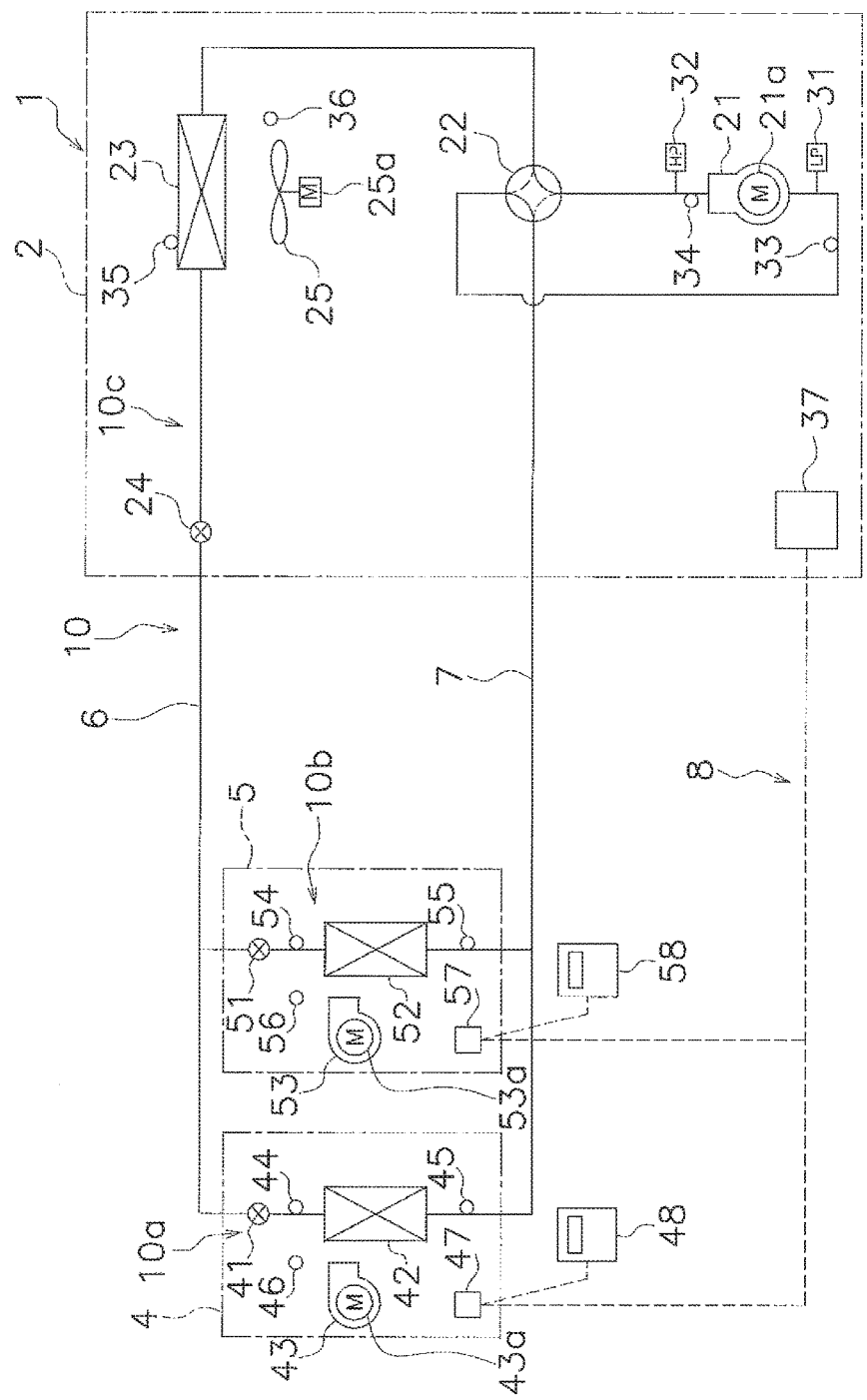
FIG. 1 is a schematic structural diagram of the air conditioning apparatus according to an embodiment of the present invention.

FIG. 1 is a schematic structural diagram of an air conditioning apparatus 1 according to an embodiment of the present invention. The air conditioning apparatus 1 is used for air conditioning a building or other indoor space by a vapor compression-type refrigerant cycle operation. The air conditioning apparatus 1 is mainly composed of an outdoor unit 2 and a plurality of (two, in this example) indoor units 4, 5 that are connected to each other. In this example, the outdoor unit 2. and the plurality of indoor units 4, 5 are connected to each other via a liquid refrigerant communication pipe 6 and a gas refrigerant communication pipe 7. In other words, a vapor compression-type refrigerant circuit 10 of the air conditioning apparatus 1 is configured by the outdoor unit 2 and the plurality of indoor units 4, 5 being connected to each other via the refrigerant communication pipes 6, 7.

<Indoor Unit>

The indoor units 4, 5 are installed indoors. The indoor units 4, 5 are connected to the outdoor unit 2 via the refrigerant communication pipes 6, 7, and constitute a portion of the refrigerant circuit 10.

The configuration of the indoor units 4. 5 is next described. The indoor unit 5 has the same configuration as the indoor unit 4. Therefore, only the configuration of the indoor unit 4 will be described, and a description of components in the configuration of the indoor unit 5 will be omitted, the reference numerals indicating the components of the indoor unit 4 being rewritten from 40s to 50s.

The indoor unit 4 mainly has an indoor-side refrigerant circuit 10a (indoor-side refrigerant circuit 10b in the indoor unit 5) constituting a portion of the refrigerant circuit 10. The indoor-side refrigerant circuit 10a mainly has an indoor expansion valve 41 and an indoor heat exchanger 42.

The indoor expansion valve 41 is an indoor flow rate regulation valve for decompressing refrigerant flowing through the indoor-side refrigerant circuit 10a to regulate the flow rate of the refrigerant. The indoor expansion valve 41 is an electrically expansion valve connected to the liquid side of the indoor heat exchanger 42.

The indoor heat exchanger 42 is composed of, e.g., a cross-fin-type fin-and-tube heat exchanger. An indoor fan 43 for sending indoor air to the indoor heat exchanger 42 is provided near the indoor heat exchanger 42. in the indoor heat exchanger 42, indoor air is blown against the indoor heat exchanger 42 by the indoor fan 43, whereby heat is exchanged between the refrigerant and indoor air. The indoor fan 43 is rotatably driven by an indoor fan motor 43a. The indoor heat exchanger 42 thereby functions as a refrigerant radiator and/or a refrigerant evaporator. The rotational speed of the indoor fan motor 43a is varied to thereby allow the airflow rate of the indoor fan 43 to be varied. In this configuration, the airflow rate of the indoor fan 43 can be modified by modifying the rotational speed of the indoor fan motor 43a in four steps. Namely, a high airflow rate H in which the rotational speed is greatest, a medium airflow rate M in which the rotational speed is less than that for the airflow rate H, a low airflow rate L in which the rotational speed is less than that for the airflow rate M, and a low-low airflow rate LL in which the rotational speed is less than that for the airflow rate L. In this case, three airflow rate settings, the airflow rate H, the airflow rate M, and the airflow rate L can be manually instructed via a remote control 48, and the airflow rate LL cannot be manually instructed via the remote control 48. The airflow rate setting of the indoor fan 43 may be switched in the four steps of the airflow rate H, the airflow rate M, and the airflow rate L, as well as the airflow rate LL, but the airflow rate setting may also have five or more steps.

Various sensors are provided to the indoor unit 4. A liquid-side temperature sensor 44 for detecting the temperature Tr1a (Tr1b in the indoor unit 5) of refrigerant in a liquid state or in a gas-liquid two-phase state is provided to the liquid side of the indoor heat exchanger 42. A gas-side temperature sensor 45 for detecting the temperature Trga (Trgb in the indoor unit 5) of the refrigerant in a gas state is provided to the gas side of the indoor heat exchanger 42. An indoor temperature sensor 46 for detecting the temperature of indoor air in the space to be air conditioned by the indoor unit 4, i.e., the indoor temperature Tra (Trb in the indoor unit 5) is provided to the indoor unit 4. The indoor unit 4 has an indoor-side control unit 47 for controlling the actuation of each component constituting the indoor unit 4. The indoor-side control unit 47 has a microcomputer, a memory, and the like provided for controlling the indoor unit 4, and is capable of exchanging control signals and the like with the remote control 48 for singularly operating the indoor unit 4 and exchanging control signals or the like with the outdoor unit 2. The remote control 48 provides various instructions and/or start/stop instructions related to the air conditioning operation, including the manual airflow rate setting of the indoor fan 43.

<Outdoor Unit>

The outdoor unit 2 is installed outdoors. The outdoor unit 2 is connected to the indoor units 4, 5 via the refrigerant communication pipes 6, 7 and constitutes a portion of the refrigerant circuit 10.

The configuration of the outdoor unit 2 is next described.

The outdoor unit 2 mainly has an outdoor-side refrigerant circuit 10c constituting a portion of the refrigerant circuit 10. The outdoor-side refrigerant circuit 10c mainly has a compressor 21, a switching mechanism 22, an outdoor heat exchanger 23, and an outdoor expansion valve 24.

The compressor 21 is a hermetic compressor in which a compression element (not shown) and a compressor motor 21a for rotatably driving the compression element are accommodated in a casing. The compressor motor 21a is supplied with power via an inverter apparatus (not shown), and is capable of variation in operation capacity by variation in the frequency (i.e., the rotational speed) of the inverter apparatus.

The switching mechanism 22 is a four-way switching valve for switching the direction of refrigerant flow. The switching mechanism 22 is capable of connecting the discharge side of the compressor 21 and the gas side of the outdoor heat exchanger 23, and connecting the intake side of the compressor 21 and the gas refrigerant communication pipe 7 in order to cause the outdoor heat exchanger 23 to function as a radiator for the refrigerant compressed in the compressor 21 and to cause the indoor heat exchangers 42, 52 to function as evaporators of the refrigerant which has radiated heat in the outdoor heat exchanger 23 during an air-cooling operation, which is one air conditioning operation (a radiation switch state, see the solid line in the switching mechanism 22 of FIG. 1). The switching mechanism 22 is capable of connecting the discharge side of the compressor 21 and the gas refrigerant communication pipe 7, and connecting the intake side of the compressor 21 and the gas side of the outdoor heat exchanger 23 in order to cause the indoor heat exchangers 42, 52 to function as radiators for the refrigerant compressed in the compressor 21 and to cause the outdoor heat exchanger 23 to function as an evaporator for the refrigerant which has radiated heat in the indoor heat exchangers 42, 52 during an air-warming operation, which is one air conditioning operation (an evaporation switch state, see the broken line in the switching mechanism 22 of FIG. 1). The switching mechanism 22 may be configured not as a four-way switching valve, but as a combination of a three-way valve and/or a solenoid valve or the like so to achieve the same function.

The outdoor heat exchanger 23 is composed of, e.g., a cross-fin-type fin-and-tube heat exchanger. An outdoor fan 25 for sending outdoor air to the outdoor heat exchanger 23 is provided near the outdoor heat exchanger 23. In the outdoor heat exchanger 23, outdoor air is blown against the outdoor heat exchanger 23 by the outdoor fan 25, whereby heat is exchanged between the refrigerant and outdoor air. The outdoor fan 25 is rotatably driven by an outdoor fan motor 25a. The outdoor heat exchanger 23 thereby functions as a refrigerant radiator and/or a refrigerant evaporator.

The outdoor expansion valve 24 decompresses refrigerant flowing through the outdoor-side refrigerant circuit 10c. The outdoor expansion valve 24 is an electrically expansion valve connected to the liquid side of the outdoor heat exchanger 23.

Various sensors are provided to the outdoor unit 2. The outdoor unit 2 is provided with an intake pressure sensor 31 for detecting the intake pressure Ps of the compressor 21, a discharge pressure sensor 32 for detecting the discharge pressure Pd of the compressor 21, an intake temperature sensor 33 for detecting the intake temperature Ts of the compressor 21, and a discharge temperature sensor 34 for detecting the discharge temperature Td of the compressor 21. An outdoor heat exchange temperature sensor 35 for detecting the temperature To1 of the refrigerant in a gas-liquid two-phase state is provided to the outdoor heat exchanger 23. An outdoor temperature sensor 36 for detecting the temperature of outside air, i.e., the outside air temperature Ta in the external space in which the outdoor unit 2 is disposed is provided to the outdoor unit 2. The outdoor unit 2 also has an outdoor-side control unit 37 for controlling the actuation of each component constituting the outdoor unit 2. The outdoor-side control unit 37 has a microcomputer, a memory, an inverter apparatus for controlling the compressor motor 21a, and the like provided for controlling the outdoor unit 2, and is capable of exchanging control signals and the like with the indoor-side control units 47, 57 of the indoor units 4, 5.

<Refrigerant Communication Pipes>

The refrigerant communication pipes 6, 7 are pipes that are used onsite when the air conditioning apparatus 1 is installed, and pipes having various lengths and diameters are used in accordance with the installation conditions of the outdoor unit 2 and the indoor units 4, 5.

<Control Unit>

Figure 2:
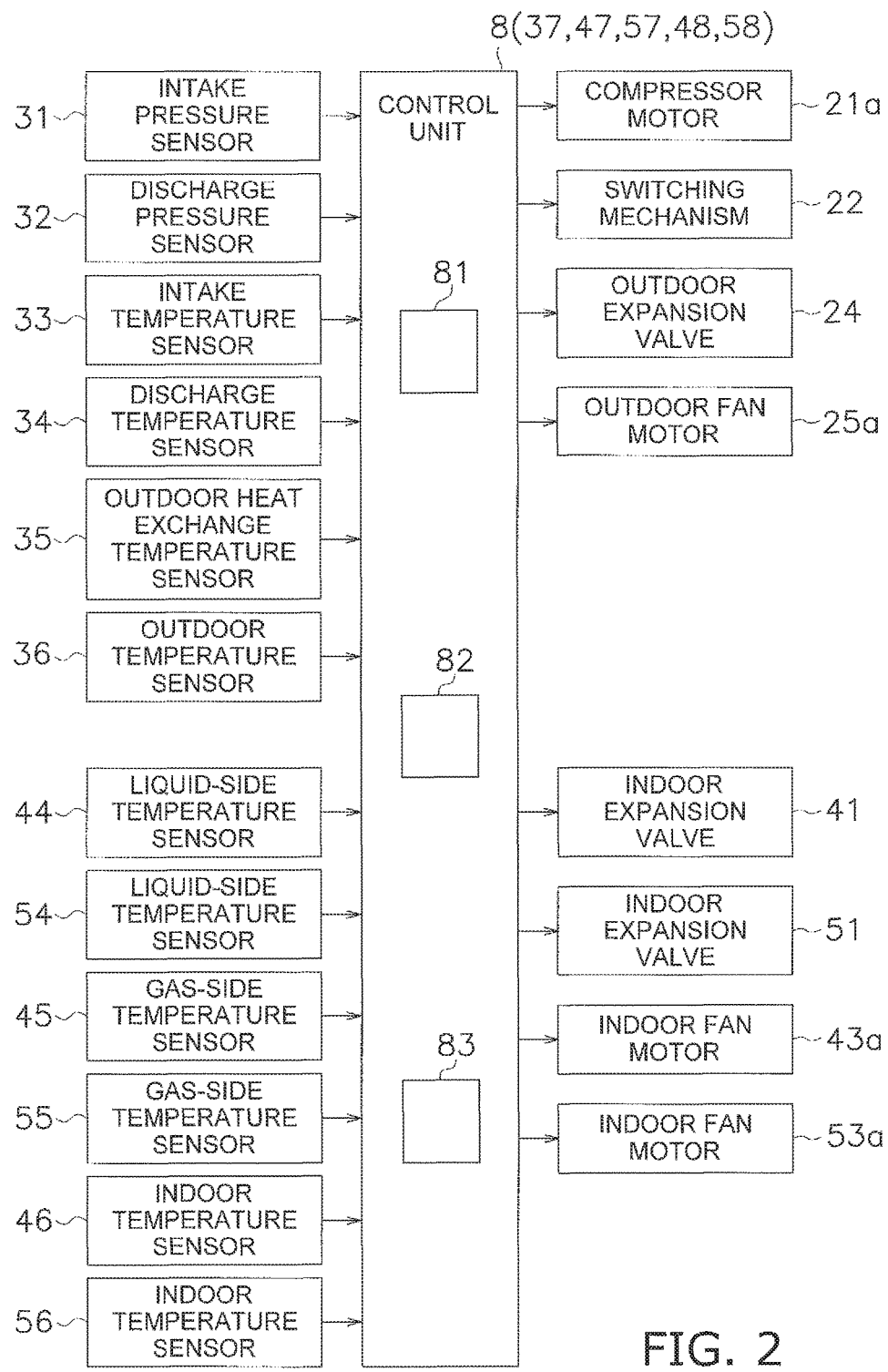
FIG. 2 is a control block diagram of the air conditioning apparatus.

Remote controls 48, 58 for individually operating the indoor units 4, 5, the indoor-side control units 47, 57 of the indoor units 4, 5, and the outdoor-side control unit 37 of the outdoor units 2 constitute a control unit 8 for controlling the overall operation of the air conditioning apparatus 1, as shown in FIG. 1. The control unit 8 is connected so as to be able to receive detection signals from the various sensors 31 to 36, 44 to 46, 54 to 56, and the like, as shown in FIG. 2. The control unit 8 is configured so as to be able to carry out the air conditioning operation (the air-cooling operation and the air-warming operation) by controlling the various devices and valves 21a, 22, 24, 26, 41, 51, 43a, 53a on the basis of these detection signals or the like. In this case, the control unit 8 mainly has outdoor capability control means 81 and indoor capability control means 82. The outdoor capability control means 81 controls the air conditioning capability of the outdoor unit 2 so that an evaporation temperature Te or a condensing temperature Tc of the refrigerant in the refrigerant circuit 10 reaches a target evaporation temperature Tes or a target condensing temperature Tcs. The indoor capability control means 82 controls the devices and valves 41, 43a, 51, 53a of the indoor units 4, 5 so that the indoor temperatures Tra, Trb of the air-conditioning spaces of the indoor units 4, 5 reach target indoor temperatures Tras, Trbs. FIG. 2 is a control block diagram of the air conditioning apparatus 1.

As described above, the air conditioning apparatus 1 has the refrigerant circuit 10 configured by a plurality (two, in this description) of the indoor units 4, 5 being connected to the outdoor unit 2. The air conditioning apparatus 1 has the indoor heat exchangers 42, 52 and the indoor fans 43, 53 in the indoor units 4, 5, and the airflow rate setting of the indoor fans 43, 53 can be manually instructed. In the air conditioning apparatus 1, the air-conditioning operation and control such as described below are carried out by the control unit 8.

(2) Basic Actuation and Basic Control of the Air Conditioning Apparatus

The basic actuation of the air-conditioning operation (the air-cooling operation and the air-warming operation) of the air conditioning apparatus 1 is next described with reference to FIG. 1.

<Air-cooling Operation>

When the air-cooling operation is instructed by the remote controls 48, 58, the switching mechanism 22 is switched to the radiation-operation state (the state indicated by the solid line of the switching mechanism 22 in FIG. I), and the compressor 21, the outdoor fan 25, and the indoor fans 43, 53 are started up. In this situation, the airflow rate setting of the indoor fans 43, 53 is manually instructed from the remote controls 48, 58 to be the airflow rate H, the airflow rate M, or the airflow rate L in accordance with the preference of the user.

At this time, the low-pressure gas refrigerant in the refrigerant circuit 10 is taken into the compressor 21 and compressed to become a high-pressure gas refrigerant. The high-pressure gas refrigerant is sent to the outdoor heat exchanger 23 via the switching mechanism 22. The high-pressure gas refrigerant sent to the outdoor heat exchanger 23 is condensed by undergoing heat exchange with outdoor air fed by the outdoor fan 25 and being cooled to become high-pressure liquid refrigerant in the outdoor heat exchanger 23, which functions as a radiator for the refrigerant. The high-pressure liquid refrigerant is sent from the outdoor unit 2 to the indoor units 4, 5 via the outdoor expansion valve 24 and the liquid refrigerant communication pipe 6.

The high-pressure liquid refrigerant sent to the indoor units 4, 5 is decompressed by the indoor expansion valves 41, 51 to become low-pressure refrigerant in gas-liquid two-phase state. The low-pressure refrigerant in a gas-liquid two-phase state is sent to the indoor heat exchangers 42, 52. The low-pressure refrigerant in a gas-liquid two-phase state sent to the indoor heat exchangers 42, 52 is evaporated by heat exchange with indoor air fed by the indoor fans 43, 53 and is heated to become low-pressure gas refrigerant in the indoor heat exchangers 42, 52, which function as evaporators for the refrigerant. The low-pressure gas refrigerant is sent from the indoor units 4, 5 to the outdoor unit 2 via the gas refrigerant communication pipe 7.

The low-pressure gas refrigerant sent to the outdoor unit 2 is again taken into the compressor 21 via the switching mechanism 22.

<Air-warming Operation>

When the air-warming operation is instructed by the remote controls 48, 58, the switching mechanism 22 is switched to the evaporation-operation state (the state indicated by the broken line of the switching mechanism 22 in FIG. 1), and the compressor 21, the outdoor fan 25, and the indoor fans 43, 53 are started up. In this situation, the airflow rate setting of the indoor fans 43, 53 is manually instructed from the remote controls 48, 58 to be the airflow rate H, the airflow rate M, or the airflow rate L in accordance with the preference of the user.

At this time, the low-pressure gas refrigerant in the refrigerant circuit 10 is taken into the compressor 21 and compressed to become a high-pressure gas refrigerant. The high-pressure gas refrigerant is sent from the outdoor unit 2 to the indoor units 4, 5 via the switching mechanism 22 and the gas refrigerant communication pipe 7.

The high-pressure gas refrigerant sent to the indoor units 4, 5 is sent to the indoor heat exchangers 42, 52. The high-pressure gas refrigerant sent to the indoor heat exchangers 42, 52 is condensed by undergoing heat exchange with indoor air fed by the indoor fans 43, 53 and being cooled to become high-pressure liquid refrigerant in the indoor heat exchangers 42, 52, which function as radiators for the refrigerant. The high-pressure liquid refrigerant is decompressed by the indoor expansion valves 41, 51. The refrigerant decompressed by the indoor expansion valves 41, 51 is sent from the indoor units 4, 5 to the outdoor unit 2 via the liquid refrigerant communication pipe 6.

The refrigerant sent to the outdoor unit 2 is sent to the outdoor expansion valve 24 and decompressed by the outdoor expansion valve 24 to become low-pressure refrigerant in a. gas-liquid two-phase state. The low-pressure refrigerant in a gas-liquid two-phase state is sent to the outdoor heat exchanger 23. The low-pressure refrigerant in a gas-liquid two-phase state sent to the outdoor heat exchanger 23 is evaporated by undergoing heat exchange with outdoor air fed by the outdoor fan 25 and being heated to become low-pressure gas refrigerant in the outdoor heat exchanger 23, which functions as an evaporator for the refrigerant. The low-pressure gas refrigerant is again taken into the compressor 21 via the switching mechanism 22.

<Basic Control>

In the air-conditioning operation (the air-cooling operation and the air-warming operation) described above, the air-conditioning capability of the outdoor unit 2 is controlled so that, first, the evaporation temperature Te or the condensing temperature Tc of the refrigerant in the refrigerant circuit 10 reaches the target evaporation temperature Tes or the target condensing temperature Tcs. In relation to the indoor temperatures Tra, Trb in the indoor units 4, 5, the indoor expansion valves 41, 51 of the indoor units 4, 5 are controlled so that the indoor temperatures Tra, Trb of the air-conditioning spaces of the indoor units 4, 5 reach target indoor temperatures Tras, Trbs. The setting of the target indoor temperatures Tras, Trbs in the indoor units 4, 5 is carried out by the remote controls 48, 58. The air-conditioning capability of the outdoor unit 2 is controlled by the outdoor capability control means 81 of the control unit 8, and the air-conditioning capability of the indoor units 4, 5 is controlled by the indoor capability control means 82 of the control unit 8.

(During Air-cooling Operation)

When the air-conditioning operation is the air-cooling operation, the indoor capability control means 82 of the control unit 8 controls the valve opening of the indoor expansion valves 41, 51 so that superheating degrees SHra, SHrb of the refrigerant in the outlets of the indoor heat exchangers 42, 52 reach target superheating degrees SHras, SHrbs of the refrigerant (hereinafter, this control shall be referred to as "superheating degree control by the indoor expansion valve"). In this configuration, the superheating degrees SHra, SHrb are calculated from the intake pressure Ps detected by the intake pressure sensor 31 and the refrigerant temperatures Trga, Trgb on the gas side of the indoor heat exchangers 42, 52 as detected by gas-side temperature sensors 45, 55. More specifically, first, the intake pressure Ps is converted to the saturation temperature of the refrigerant to obtain the evaporation temperature Te, which is the state quantity equivalent to the evaporation pressure Pe in the refrigerant circuit 10. In this case, the evaporation pressure Pe refers to the pressure that represents the low-pressure refrigerant flowing between the outlet of the indoor expansion valves 41, 51 and the intake side of the compressor 21 via the indoor heat exchangers 42, 52 during the air-cooling operation. The evaporation temperature Te is subtracted from the temperatures Trga, Trgb of the refrigerant on the gas side of the indoor heat exchangers 42, 52 to thereby obtain the superheating degrees SHra, SHrb.

When the air-conditioning operation is the air-cooling operation, the outdoor capability control means 81 of the control unit 8 controls the operating capacity of the compressor 21 so that the evaporation temperature Te corresponding to the evaporation pressure Pe in the refrigerant circuit 10 approximates the target evaporation temperature Tes (hereinafter, this control shall be referred to as "evaporation temperature control by the compressor"). In this configuration, the operating capacity of the compressor 21 is controlled by modifying the frequency of the compressor motor 21a. Also in this configuration, the controlled state quantity is the evaporation temperature Te, but the state quantity may also be the evaporation pressure Pe. In this case, a target evaporation pressure Pes corresponding to the target evaporation temperature Tes may be used. In other words, the evaporation pressure Pe and the evaporation temperature Te, and the target evaporation pressure Pes and the target evaporation temperature Tes may differ in wording, but are essentially the same state quantity.

Thus, the superheating degrees are controlled by the indoor expansion valves 41, 51 and the evaporation temperature is controlled by the compressor 21 as basic control in the air-cooling operation. In the air conditioning apparatus 1, the indoor temperatures Tra, Trb in the indoor units 4, 5 are brought to the target indoor temperatures Tras, Trbs by such basic control in the air-cooling operation.

(During Air-warming Operation)

When the air-conditioning operation is the air-warming operation, the indoor capability control means 82 of the control unit 8 controls the valve opening of the indoor expansion valves 41, 51 so that the subcooling. degrees SCra, SCrb of the refrigerant in the outlets of the indoor heat exchangers 42, 52 reach target subcooling degrees SCras, SCrbs of the refrigerant (hereinafter, this control shall be referred to as "subcooling degree control by the indoor expansion valve"). In this configuration, the subcooling degrees SCra, SCrb are calculated from the discharge pressure Pd detected by the discharge pressure sensor 32 and the refrigerant temperatures Tr1a, Tr1b on the liquid side of the indoor heat exchangers 42, 52 as detected by liquid-side temperature sensors 44, 54. More specifically, first, the discharge pressure Pd is converted to the saturation temperature of the refrigerant to obtain the condensing temperature Tc, which is the state quantity equivalent to the condensing pressure Pc in the refrigerant circuit 10. In this case, the condensing pressure Pc refers to the pressure that represents the high-pressure refrigerant flowing between the discharge side of the compressor 21 and the indoor expansion valves 41, 51 via the indoor heat exchangers 42, 52 during the air-warming operation. The temperatures Tr1a, Tr1b of the refrigerant on the liquid side of the indoor heat exchangers 42, 52 are subtracted from the condensing temperature Tc to thereby obtain the subcooling degrees SCra, SCrb.

When the air-conditioning operation is the air-warming operation, the outdoor capability control means 81 of the control unit 8 controls the operating capacity of the compressor 21 so that the condensing temperature Tc corresponding to the condensing pressure Pc in the refrigerant circuit 10 approximates the target condensing temperature Tcs (hereinafter, this control shall be referred to as "condensing temperature control by the compressor"). In this configuration, the operating capacity of the compressor 21 is controlled by modifying the frequency of the compressor motor 21a. Also in this configuration, the controlled state quantity is the condensing temperature Tc, but the state quantity may also be the condensing pressure Pc. In this case, a target condensing pressure Pcs corresponding to the target condensing temperature Tcs may be used. In other words, the condensing pressure Pc and the condensing temperature Tc, and the target condensing pressure Pcs and the target condensing temperature Tcs may differ in wording, but are essentially the same state quantity.

Thus, the subcooling degrees are controlled by the indoor expansion valves 41, 51 and the condensing temperature is controlled by the compressor 21 as basic control in the air-warming operation. In the air conditioning apparatus 1, the indoor temperatures Tra, Trb in the indoor units 4, 5 are brought to the target indoor temperatures Tras, Trbs by such basic control in the air-warming operation.

(3) Indoor Airflow Rate Limitation Control

When the air-conditioning operations (the air-cooling operation and the air-warming operation) that accompanies basic control as described above is carried out, the indoor temperatures Tra, Trb in the indoor units 4, 5 are brought to the target indoor temperatures Tras, Trbs.

In this case, the target evaporation temperature Tes and/or the target condensing temperature Tcs used in evaporation temperature control and/or condensing temperature control by the compressor 21 may be varied in accordance with the outside air temperature Ta, as described in Patent Literature 1. In other words, the target evaporation temperature Tes may be reduced in commensurate fashion to a higher outside air temperature Ta (conversely, the target evaporation temperature Tes may be increased in commensurate fashion to a lower outside air temperature Ta) during the air-cooling operation, and the target condensing temperature Tcs may be increased is commensurate fashion to a lower outside air temperature Ta (conversely, the target condensing temperature Tcs may be reduced in commensurate fashion to a higher outside air temperature Ta) during the air-warming operation. When the target evaporation temperature Tes and/or the target condensing temperature Tcs are thusly varied, the target evaporation temperature Ies increases when the outside air temperature Ta is low and air-conditioning capability of the indoor units 4, 5 is trending downward during the air-cooling operation, and since the target condensing temperature Tcs decreases when the outside air temperature Ta is high and the air-conditioning capability of the indoor units 4, 5 is trending downward during the air-warming operation, excess air-conditioning capability of the outdoor unit 2 is suppressed, i.e., the operating capacity of the compressor 21 is reduced. As such, the power consumption of the compressor 21 can be reduced and the APF can thereby be improved.

However, even if the target evaporation temperature Tes and/or the target condensing temperature Tcs used in evaporation temperature control and/or condensing temperature control by the compressor 21 is varied in accordance with the outside air temperature Ta in air-conditioning operation that accompanies basic control as described above, the manually instructed airflow rate setting is maintained even when there is an unnecessarily high airflow rate (e.g., the airflow rate H is set even though the airflow rate L would be sufficient) when the airflow rate setting of the indoor fans 43, 53 in the indoor units 4, 5 are in the state manually instructed by remote controls 48, 58. As a result, the power consumption of the indoor fans 43, 53 is wasted.

Thus, merely varying the target evaporation temperature Tes and/or the target condensing temperature Tcs in accordance with the outside air temperature Ta in air-conditioning operation that accompanies basic control such as described above allows the APF to be improved in commensurate fashion to the reduction in the power consumption of the compressor 21, but when the airflow rate of the indoor fans 43, 53 is unnecessarily high. Therefore, the indoor fans 43, 53 wastefully consume power and the improvement in the APF is liable to be insufficient.

In view of the above, in order to allow wasteful power consumption of the indoor fans 43, 53 to be reduced and the APF to be improved in this configuration, the indoor airflow rate limitation control for forcibly limiting the airflow rate setting of the indoor fans 43, 53 to be nearer to a low airflow rate in accordance with the outside air temperature Ta is carried out with the airflow rate setting of the indoor fans 43, 53 manually instructed. In this situation, the indoor airflow rate limitation control is carried out by providing airflow rate upper limits Gcx, Ghx of the indoor fans 43, 53 that can be modified in accordance with the outside air temperature Ta and reducing the airflow rate upper limits Gcx, Ghx of the indoor fans 43, 53. More specifically, the airflow rate upper limit Gcx of the indoor fans 43, 53 is reduced in accordance with a reduction in the outside air temperature Ta during the air-cooling operation, and the airflow rate upper limit Ghx of the indoor fans 43, 53 is reduced in accordance with an increase in the outside air temperature Ta during the air-warming operation.

Figure 3:
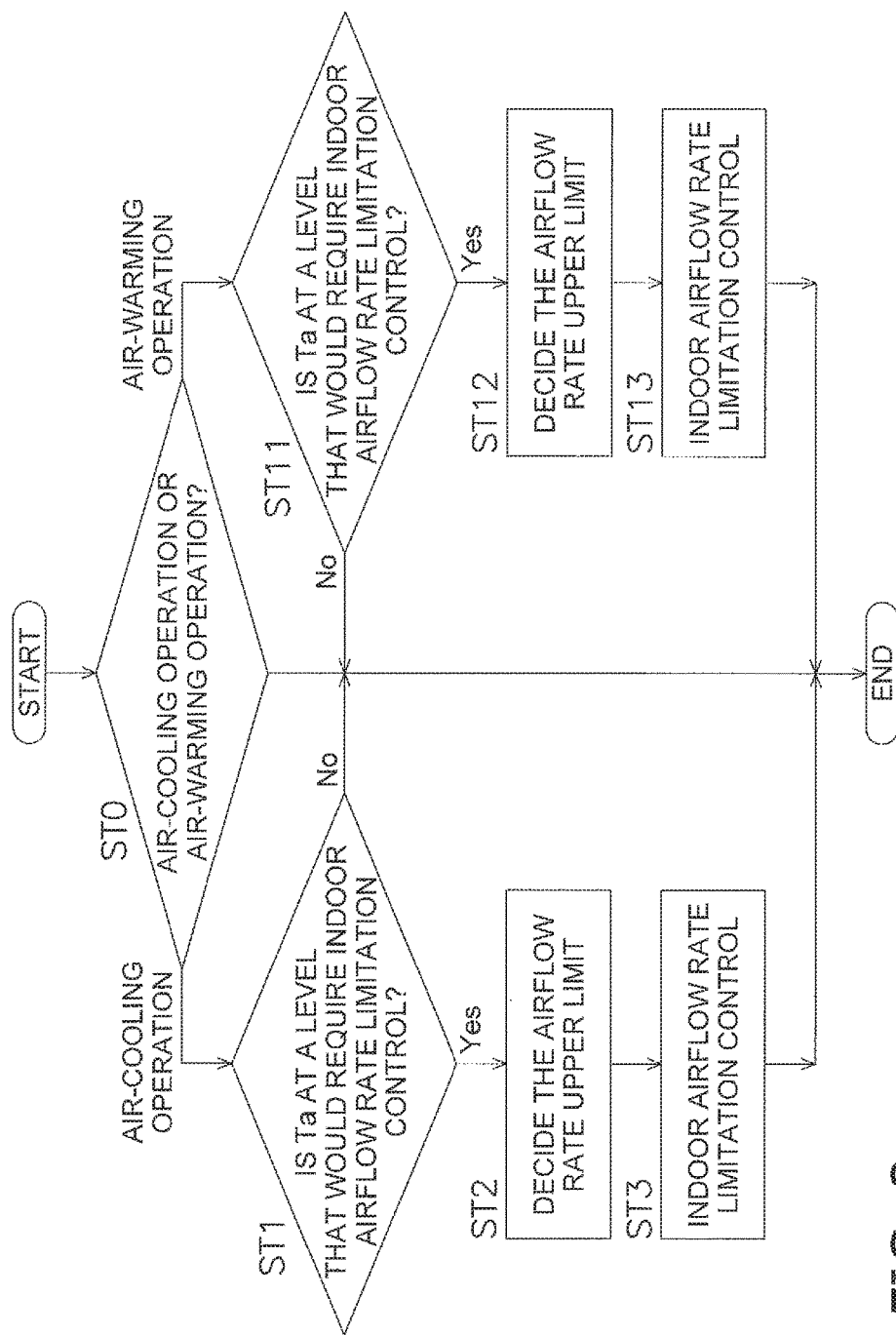
FIG. 3 is a flowchart showing the indoor airflow rate limitation control.
Figure 4:
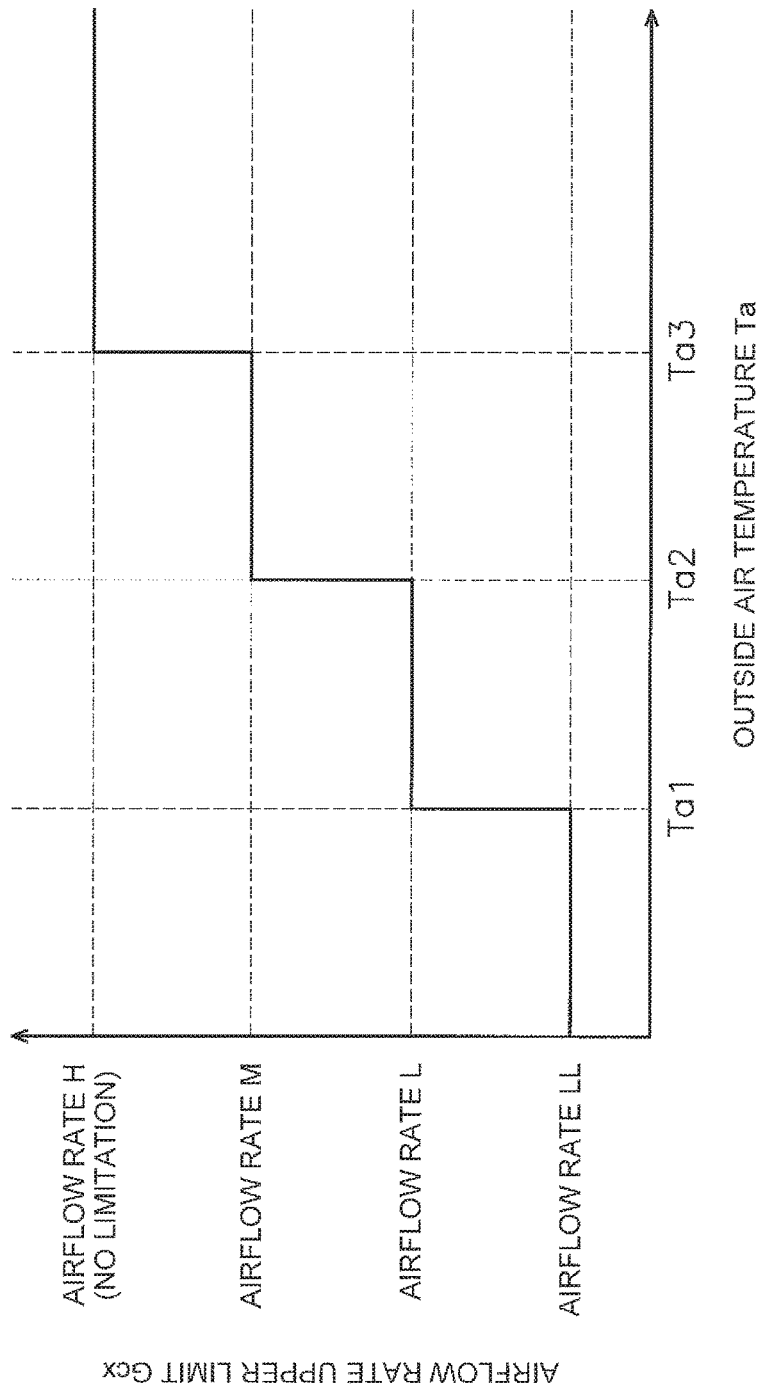
FIG. 4 shows the relationship between the outside air temperature and the airflow rate upper limit of the indoor fans during the air-cooling operation.
Figure 5:
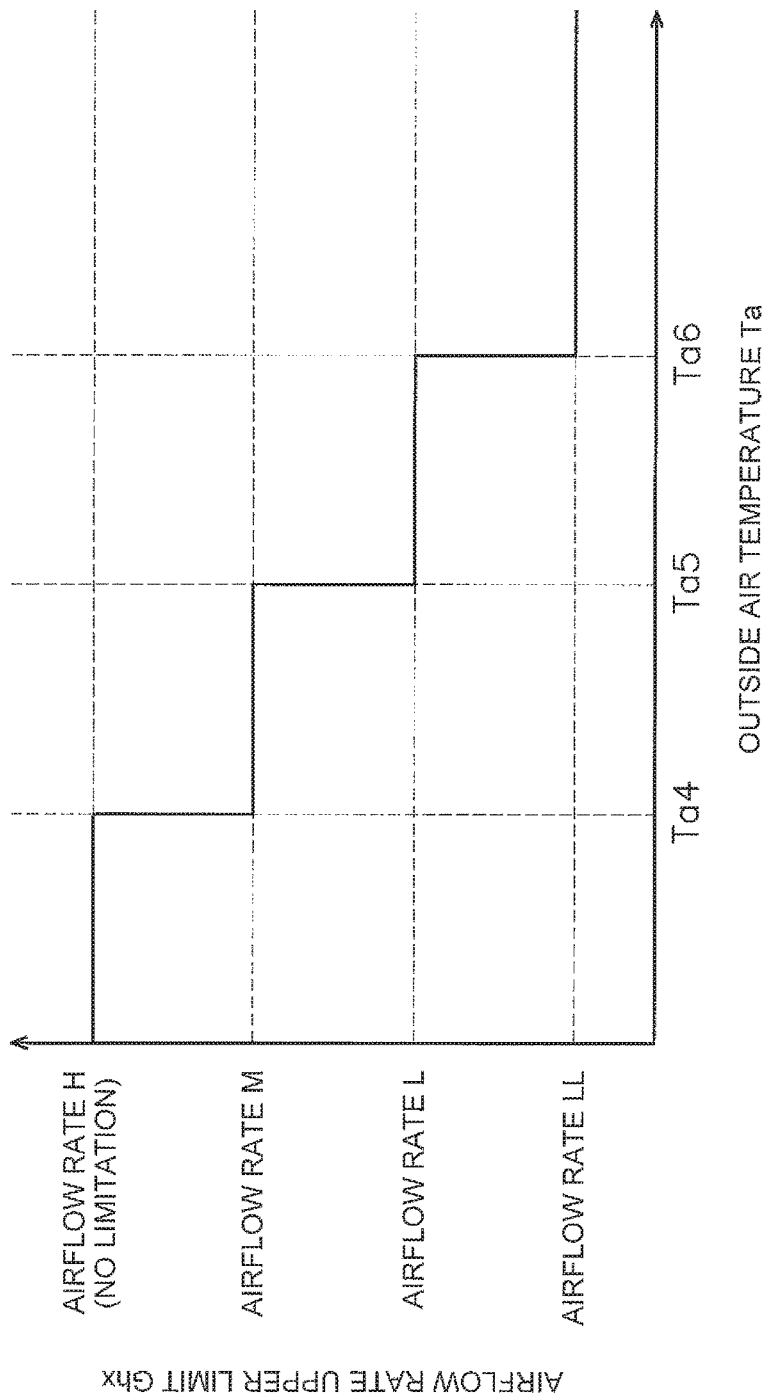
FIG. 5 shows the relationship between the outside air temperature and the airflow rate upper limit of the indoor fans during the air-warming operation.

The indoor airflow rate limitation control of the indoor fans 43, 53 is next described with reference to FIGS. 1 to 5. FIG. 3 is a flowchart showing the indoor airflow rate limitation control. FIG. 4 shows the relationship between the outside air temperature Ta and the airflow rate upper limit Gcx of the indoor fans 43, 53 during the air-cooling operation. FIG. 5 shows the relationship between the outside air temperature Ta and the airflow rate upper limit Ghx of the indoor fans 43, 53 during the air-warming operation. The indoor airflow rate limitation control of the indoor fans 43, 53 is carried out by the indoor capability control means 82 of the control unit 8.

Specifically, first, in a step ST0, it is determined whether the current air-conditioning operation is the air-cooling operation or the air-warming operation. When it is determined in the step ST0 that the current air-conditioning operation is the air-cooling operation, the process proceeds to a step ST1, and when it is determined in the step ST1 that the current air-conditioning operation is the air-warming operation, the process proceeds to a step ST11.

It is next determined in the steps ST1 and ST11 whether the airflow rate setting of the indoor fans 43, 53 must be forcibly limited to be nearer to the low airflow rate in accordance with the outside air temperature Ta. At this point, it is determined whether the outside air temperature Ta during the air-cooling operation is equal to or less than a third outside air temperature Ta3. In this case, the third outside air temperature Ta3 is the threshold value for determining whether to limit the airflow rate upper limit Gcx of the indoor fans 43, 53 during the air-cooling operation from the airflow rate H (i.e., no airflow rate limitation) to the airflow rate M (see FIG. 4). Also, it is determined whether the outside air temperature Ta during the air-warming operation is equal to or greater than a fourth outside air temperature Ta4. In this case, the fourth outside air temperature Ta4 is the threshold value for determining whether to limit the airflow rate upper limit Ghx of the indoor fans 43, 53 during the air-warming operation from the airflow rate H (i.e., no airflow rate limitation) to the airflow rate M (see FIG. 5). The process proceeds to the processing of steps ST2 and ST12 when it has been determined in the the steps ST1 and ST11 that the airflow rate setting of the indoor fans 43, 53 must be forcibly limited to be nearer to the low airflow rate in accordance with the outside air temperature Ta. The airflow rate setting of the indoor fans 43, 53 is not limited (essentially, the airflow rate upper limits Gcx, Ghx are the airflow rate H) when it has been determined in the steps ST1 and ST11 that the airflow rate setting of the indoor fans 43, 53 is not required to be forcibly limited to be nearer to the low airflow rate in accordance with the outside air temperature Ta. Accordingly, the air-cooling operation or the air-warming operation is continued with the airflow rate setting of the indoor fans 43, 53 maintained as manually instructed from the remote controls 48, 58.

Next, the airflow rate upper limits Gcx, Ghx of the indoor fans 43, 53 which can be modified in accordance with the outside air temperature Ta are decided in the steps ST2 and ST12. Specifically, when the outside air temperature Ta is between a second outside air temperature Ta2 and the third outside air temperature Ta3 during the air-cooling operation, as shown in FIG. 4, the airflow rate upper limit Gcx is set to the airflow rate M; when the outside air temperature Ta is between a first outside air temperature Ta1 and the second outside air temperature Ta2, the airflow rate upper limit Gcx is set to the airflow rate L; and when the outside air temperature Ta is equal to or less than the first outside air temperature Ta1, the airflow rate upper limit Gcx is set to the airflow rate LL. Thus, the airflow rate upper limit Gcx of the indoor fans 43, 53 is reduced in accordance with the reduction in the outside air temperature Ta during the air-cooling operation. When the outside air temperature Ta is between the fourth outside air temperature Ta4 and a fifth outside air temperature Ta5 during the air-warming operation, as shown in FIG. 5, the airflow rate upper limit Ghx is set to the airflow rate M; when the outside air temperature Ta is between the fifth outside air temperature Ta5 and a sixth outside air temperature Ta6, the airflow rate upper limit Ghx is set to the airflow rate L; and when the outside air temperature Ta is equal to or greater than the sixth outside air temperature Ta6, the airflow rate upper limit Ghx is set to the airflow rate LL. Thus, the airflow rate upper limit Ghx of the indoor fans 43, 53 is reduced in accordance with the increase in the outside air temperature Ta during the air-warming operation.

After the airflow rate upper limits Gcx, Ghx of the indoor fans 43, 53, which can be modified in accordance with the outside air temperature Ta, have been decided in the steps ST2 and ST12, the process proceeds to the processing of steps ST3 and ST13, and the indoor airflow rate limitation control for forcibly limiting the airflow rate setting of the indoor fans 43, 53 to be nearer to the low airflow rate in accordance with the outside air temperature Ta is carried out.

In other words, the airflow rate upper limits Gcx, Ghx of the indoor fans 43, 53 are set to the airflow rate decided in the steps ST2 and ST12. For example, consider the case in which the outside air temperature Ta is between the first outside air temperature Ta1 and the second outside air temperature Ta2, and the air-cooling operation is carried out with the airflow rate setting of the indoor fans 43, 53 having been manually instructed to be the airflow rate H from the remote controls 48, 58. In this case, the airflow rate upper limit Gcx is the airflow rate L in the step ST2, and the airflow rate setting of the indoor fans 43, 53 is therefore limited from the manually instructed airflow rate H to the airflow rate L, which is the airflow rate upper limit Gcx. Consider also the case in which the outside air temperature Ta is between the fifth outside air temperature Ta5 and the sixth outside air temperature Ta6, and the air-warming operation is carried out with the airflow rate setting of the indoor fans 43, 53 having been manually instructed to be the airflow rate H from the remote controls 48, 58. In this case, the airflow rate upper limit Ghx is the airflow rate L in the step ST12, and the airflow rate setting of the indoor fans 43, 53 is therefore limited from the manually instructed airflow rate H to the airflow rate L, which is the airflow rate upper limit Ghx. On the other hand, when the air-cooling operation or the air-warming operation is carried out with the airflow rate setting of the indoor fans 43, 53 having been manually instructed to he the airflow rate L in the envisioned examples of the outside air temperature Ta above, the airflow rate upper limits Gcx, Ghx in the steps ST2 and ST12 are the airflow rate L, and the airflow rate setting of the indoor fans 43, 53 is therefore kept at the manually instructed airflow rate L.

As described above, the indoor airflow rate limitation control is carried out in this case with the airflow rate setting of the indoor fans 43, 53 having been manually instructed, and the airflow rate of the indoor fans 43, 53 can be forcibly reduced when the airflow rate of the indoor fans 43, 53 is unnecessarily high in view of the outside air temperature Ta.

Wasteful power consumption by the indoor fans 43, 53 can be reduced and the APF improved in such a situation.

As described above, providing the airflow rate upper limits Gcx, Ghx for the indoor fans 43, 53 allows the indoor airflow rate limitation control to be carried out, and the airflow rate setting of the indoor fans 43, 53 can therefore be forcibly reduced to the airflow rate upper limits Gcx, Ghx in the case that the manually instructed airflow rate setting of the indoor fans 43, 53 is at a higher airflow rate than the airflow rate upper limits Gcx, Ghx. On the other hand, when the manually instructed airflow rate setting of the indoor fans 43, 53 is equal to or less than the airflow rate upper limits Gcx, Ghx, the airflow rate setting of the indoor fans 43, 53 is kept at the manually instructed airflow rate setting of the indoor fans 43, 53.

The indoor airflow rate limitation control can thereby be carried out while the manually instructed airflow rate setting of the indoor fans 43, 53 is maintained to the extent possible.

Indoor airflow rate limitation control such as described above has the above-noted advantages, but there may be users who would prefer that indoor airflow rate limitation control not to be used because there are cases in which the manually instructed airflow rate setting of the indoor fans 43, 53 is ignored.

In view of this situation, indoor airflow rate limitation setting means 83 is provided to the control unit 8, as shown in FIG. 2, in order to allow the user to select whether to use the indoor airflow rate limitation control in accordance with user preference. In this case, the indoor airflow rate setting means 83 is memory provided to the outdoor-side control unit 37 of the control unit 8 and is configured so as to allow settings such as whether the indoor airflow rate limitation control is to be used and/or the relational values between the outside air temperature Ta and the airflow rate upper limits Gcx, Ghx by communication from an external device for carrying out various controls and settings or the like of the air conditioning apparatus 1. The indoor airflow rate setting means 83 is not limited to that described above, and may be any arrangement that allows settings such as whether the indoor airflow rate limitation control is to be used and/or relational values between the outside air temperature Ta and the airflow rate upper limits Gcx, Ghx, an example being that of a dipswitch or the like provided to the outdoor-side control unit 37.

(4) Modifications

<A>

When the indoor airflow rate limitation control in the embodiment described above is being carried out, the indoor temperatures Tra, Trb may diverge from the target indoor temperatures Tras, Trbs when the indoor air-conditioning load increases or other variation occurs in the operating state, and in such a case, is it not desirable for the airflow rate setting of the indoor fans 43, 53 to be excessively limited to be nearer to the low airflow rate. In view of the above, when the indoor airflow rate limitation control is being carried out in such a case, the limitation of the airflow rate setting of the indoor fans 43, 53 to be nearer the low airflow rate is relaxed when the indoor temperatures Tra, Trb diverge from the target indoor temperatures Tras, Trbs.

Figure 6:
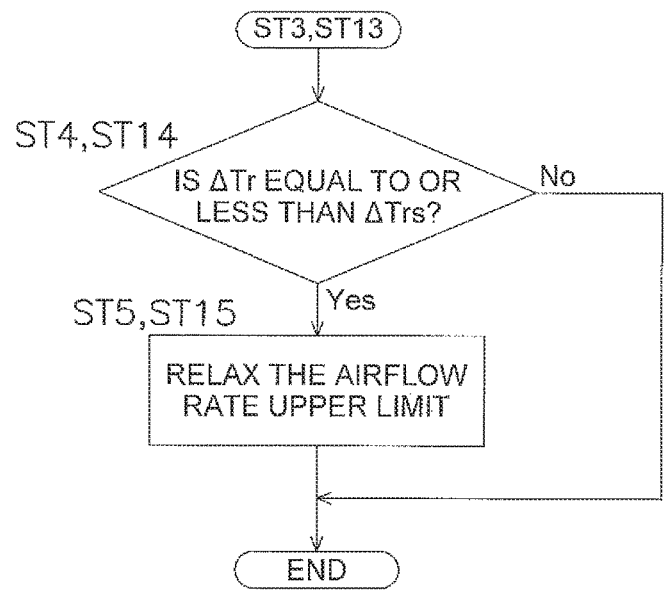
FIG. 6 is a flowchart showing the main elements of the indoor airflow rate limitation control related to Modification <A>.

The indoor airflow rate limitation control of the indoor fans 43, 53 in the present modification is next described with reference to FIGS. 1 to 6. FIG. 6 is a flowchart showing the main elements of the indoor airflow rate limitation control related to the present modification. The indoor airflow rate limitation control of the indoor fans 43, 53 is carried out by the indoor capability control means 82 of the control unit 8 in the same manner as the embodiment described above.

Specifically, when the indoor airflow rate limitation control of the steps ST3 and ST13 is being carried out, the processing of steps ST4 and ST14 is added, and it is determined whether the indoor temperatures Tra, Trb are at a distance from the target indoor temperatures Tras, Trbs. In these steps, it is determined whether the temperature difference obtained by subtracting the target indoor temperatures Tras, Trbs from the indoor temperatures Tra, Trb during the air-cooling operation, or the indoor temperature difference ΔTr obtained by subtracting the indoor temperatures Tra, Trb from the target indoor temperatures Tras, Trbs during the air-warming operation is equal to or greater than the temperature difference ΔTrs for relaxing the airflow rate limit. When the indoor temperature difference ΔTr has been determined to be equal to or greater than the temperature difference ΔTrs for relaxing the airflow rate limit in the steps ST4 and ST14, the processing of steps ST5 and ST15 is added and the process proceeds to the processing of the steps ST5 and ST15. On the other hand, in the steps ST4 and ST14, the airflow rate upper limits Gcx. Ghx of the indoor fans 43, 53 set in the steps ST3 and 5113 are maintained when the indoor temperature difference ΔTr has been determined to be less than the temperature difference ΔTrs for relaxing the airflow rate limit.

Next, in the steps ST5 and ST15, the airflow rate upper limits Gcx, Ghx of the indoor fans 43, 53 are relaxed. In this situation, the airflow rate is increased in one or more steps from the airflow rate upper limits Gcx, Ghx of the indoor fans 43, 53 set in the steps ST3 and ST13. For example, consider the case in which the outside air temperature Ta is between the first outside air temperature Ta1 and the second outside air temperature Ta2, and the air-cooling operation is carried out with the airflow rate setting of the indoor fans 43, 53 having been manually instructed to be the airflow rate H from the remote controls 48, 58. In this case, the airflow rate upper limit Gcx is the airflow rate L in the step ST2, and the airflow rate setting of the indoor fans 43, 53 is therefore limited in the step ST3 from the manually instructed airflow rate H to the airflow rate L, which is the airflow rate upper limit Gcx. However, when the indoor temperature difference ΔTr has been determined in the step ST4 to be equal to or greater than the temperature difference ΔTrs for relaxing the airflow rate limit, the airflow rate upper limit Gcx is increased from the airflow rate L to the airflow rate M in the step ST5, whereby the limitation to be nearer to the low airflow rate is relaxed. Consider also the case in which the outside air temperature Ta is between the fifth outside air temperature Ta5 and the sixth outside air temperature Ta6, and the air-warming operation is carried out with the airflow rate setting of the indoor fans 43, 53 having been manually instructed to be the airflow rate H from the remote controls 48, 58. In this case, the airflow rate upper limit Ghx is the airflow rate L in the step ST12, and the airflow rate setting of the indoor fans 43, 53 is therefore limited from the manually instructed airflow rate H to the airflow rate L, which is the airflow rate upper limit Ghx. However, when the indoor temperature difference ΔTr has been determined in the step ST14 to be equal to or greater than the temperature difference ΔTrs for relaxing the airflow rate limit, the airflow rate upper limit Ghx is increased from the airflow rate L to the airflow rate M in step ST15, whereby the limitation to be nearer to the low airflow rate is relaxed.

The indoor airflow rate limitation control can be suitably performed with consideration given to not only the outside air temperature Ta, but also to variation in the indoor temperatures Tra, Trb.

<B>

In the embodiment and modification thereof described above, when the indoor air-conditioning load is high, limiting the airflow rate setting of the indoor fans 43, 53 to be nearer to the low airflow rate even when the airflow rate of the indoor fans 43, 53 is considerable in view of the outside air temperature Ta makes it difficult to process the indoor air-conditioning load, and in such a case, the indoor airflow rate limitation control is not preferred. When the indoor air-conditioning load is high, the indoor temperatures Tra, Trb are diverging from the target indoor temperatures Tras, Trbs.

In view of the above, the indoor airflow rate limitation control is carried out when the indoor temperatures Tra, Trb are near the target indoor temperatures Tras, Trbs. with the airflow rate of the indoor fans 43, 53 being considerable in view of the outside air temperature Ta, and the indoor airflow rate limitation control is not carried out when the indoor temperatures Tra, Trb diverges from the target indoor temperatures Tras, Trbs.

Figure 7:
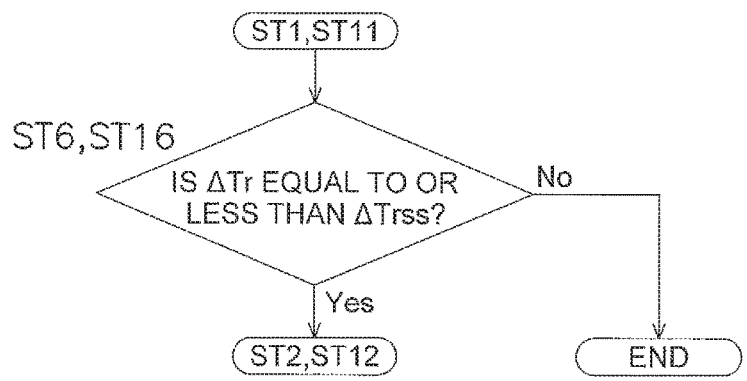
FIG. 7 is a flowchart showing the main elements of the indoor airflow rate limitation control related to Modification <B>.

The indoor airflow rate limitation control of the indoor fans 43, 53 in the present modification is next described with reference to FIGS. 1 to 7. FIG. 7 is a flowchart showing the main elements of the indoor airflow rate limitation control related to the present modification. The indoor airflow rate limitation control of the indoor fans 43. 53 is carried out by the indoor capability control means 82 of the control unit 8 in similar fashion to the embodiment and the modification <A> described above.

Specifically, in steps ST1 and ST11, when it has been determined that the airflow rate setting of the indoor fans 43, 53 must be forcibly limited to be nearer the low airflow rate in accordance with the outside air temperature Ta, the processing of steps ST6 and ST16 are added, and it is then determined whether the indoor temperatures Tra, Trb are near the target indoor temperatures Tras, Trbs. At this point, it is determined whether the temperature difference obtained by subtracting the target indoor temperatures Tras, Trbs from the indoor temperatures Tra. Trb during the air-cooling operation, or the indoor temperature difference ΔTr obtained by subtracting the indoor temperatures Tra, Trb from the target indoor temperatures Tras, Trbs during the air-warming operation is equal to or less than a temperature difference ΔTrss for permitting the airflow rate to be limited. When the indoor temperature difference ΔTr is determined in the steps ST6 and ST16 to be equal to or less than the temperature difference ΔTrss for permitting the airflow rate to be limited, the process proceeds to the processing of the steps ST2 and ST12. On the other hand, when the indoor temperature difference ΔTr is determined in the steps ST6 and ST16 to be greater than the temperature difference ΔTrss for permitting the airflow rate to be limited, the air-cooling operation or the air-warming operation is continued while the airflow rate setting of the indoor fans 43, 53 manually instructed from the remote controls 48, 58 is maintained without the airflow rate setting of the indoor fans 43, 53 being limited.

In this case, the indoor airflow rate limitation control can thereby be carried out, as appropriate, with consideration given not just to the outside air temperature Ta, but to the indoor air-conditioning load as well.

The determination of the indoor temperature difference Sir in the steps ST6 and ST16 may be made with the indoor units 4, 5 or in combination with a representative value of the indoor temperature difference ΔTr of the indoor units 4, 5. For example, it may be determined whether an average value of the indoor temperature differences ΔTr of the indoor units 4, 5 is equal to or less than the temperature difference ΔTrss for permitting the airflow rate to be limited. Also, it may be determined whether a maximum value of the indoor temperature difference ΔTr of the indoor units 4, 5 is equal to or less than the temperature difference ΔTrss for permitting the airflow rate to be limited. Furthermore, it may be determined whether a minimum value of the indoor temperature difference ΔTr of the indoor units 4, 5 is equal to or less than the temperature difference ΔTrss for permitting the airflow rate to be limited. Moreover, it may be determined whether a weighted average value of the indoor temperature differences ΔTr of the indoor units 4, 5 is equal to or less than the temperature difference ΔTrss for permitting the airflow rate to be limited. In this case, it is possible to use as the weighted average value a value, e.g., Σ (the operating capacity of the indoor units×the indoor temperature difference ΔTr)/number of the indoor units, in which consideration is given to the operating capacity of the indoor units 4, 5.

<C>

In the embodiment and modifications thereof described above, when the indoor air-conditioning load is high, limiting the airflow rate setting of the indoor fans 43, 53 to be nearer to the low airflow rate even when the airflow rate of the indoor fans 43, 53 is considerable in view of the outside air temperature Ta makes it difficult to process the indoor air-conditioning load, and in such a case, the indoor airflow rate limitation control is not preferred. When the indoor air-conditioning load is high, the flow rate of refrigerant flowing through the indoor heat exchangers 42, 52 tends to increase.

In view of the above, it is determined in this case whether the indoor air-conditioning load is high by using valve openings MVa, MVb of the indoor expansion valves 41, 51 as indoor flow rate regulation valves in which the valve openings increase as the flow rate of refrigerant flowing through the indoor heat exchangers 42, 52 increases.

Figure 8:
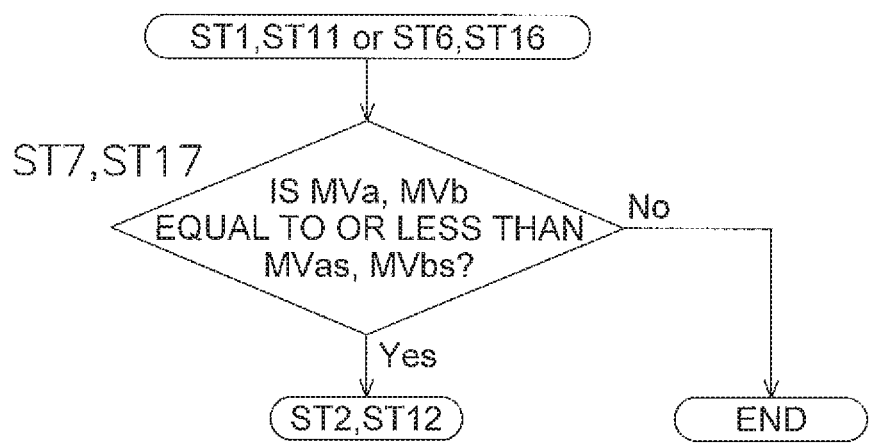
FIG. 8 is a flowchart showing the main elements of the indoor airflow rate limitation control related to Modification <C>.

The indoor airflow rate limitation control of the indoor fans 43, 53 in the present modification is next described with reference to FIGS. 1 to 8. FIG. 8 is a flowchart showing the main elements of the indoor airflow rate limitation control related to the present modification. The indoor airflow rate limitation control of the indoor fans 43, 53 is carried out by the indoor capability control means 82 of the control unit 8 in similar fashion to the embodiment and the modifications <A> and <B> described above.

Specifically, when it has been determined in the steps ST1 and ST11 that the airflow rate setting of the indoor fans 43, 53 must be forcibly limited to be nearer the low airflow rate in accordance with the outside air temperature Ta, and when it has been determined in the steps ST6 and ST16 in addition to the determination in the steps ST1 and ST11 that the indoor temperatures Tra, Trb are near the target indoor temperatures Tras, Trbs, the processing of steps ST7 and ST17 are added, and it is then determined whether the valve openings MVa, MVb of the indoor expansion valves 41, 51 as the indoor flow rate regulation valves are equal to or less than openings MVas, MVbs for permitting the airflow rate to be limited. When it has been determined in the steps ST7 and ST17 that the valve openings MVb of the indoor expansion valves 41, 51 as the indoor flow rate regulation valves are equal to or less than the openings MVas, MVbs for permitting the airflow rate to be limited, the process proceeds to the processing of the steps S2, ST12. On the other hand, when it has been determined in the steps ST7 and ST17 that the valve openings MVa, MVb of the indoor expansion valves 41, 51 as the indoor flow rate regulation valves are greater than the openings MVas, MVbs for permitting the airflow rate to be limited, the air-cooling operation or the air-warming operation is continued while the airflow rate setting of the indoor fans 43, 53 manually instructed from the remote controls 48, 58 is maintained without the airflow rate setting of the indoor fans 43, 53 being limited.

In this case, the indoor airflow rate limitation control can thereby be carried out, as appropriate, with consideration given not just to the outside air temperature Ta, but to the indoor air-conditioning load as well.

<D>

In the embodiment and modifications thereof described above, the indoor airflow rate limitation control is carried out by providing the airflow rate upper limit to the indoor fans 43, 53 which can be modified in accordance with the outside air temperature Ta, but no limitation is imposed thereby. For example, the manually instructed airflow rate setting of the indoor fans 43, 53 may be reduced to be nearer the low airflow rate in one or more steps when it has been determined that the indoor airflow rate limitation control is required.

<E>

In the embodiment and modifications thereof described above, the present invention is applied to the air conditioning apparatus 1 which is capable of switching between the air-cooling operation and the air-warming operation, but no limitation is imposed thereby; the present invention can also be applied to an air conditioning apparatus dedicated to air cooling or to an air conditioning apparatus dedicated to air warming.

<G>

In the embodiment and modifications thereof described above, the present invention is applied to the air conditioning apparatus 1 in which the indoor units 4, 5 have the indoor expansion valves 41, 51 as the indoor flow rate regulation valves, but no limitation is imposed thereby, and the present invention can also be applied to an air conditioning apparatus in which the outdoor unit 2 has the indoor expansion valves 41, 51 as the indoor flow rate regulation valves.

<H>

In the embodiment and modifications thereof described above, the present invention is applied to the air conditioning apparatus 1 in which a plurality of the indoor units 4, 5 are connected to the outdoor unit 2, but no limitation is imposed thereby, and the present invention can also be applied to an air conditioning apparatus in which a single indoor unit is connected to the outdoor unit.

INDUSTRIAL APPLICABILITY

The present invention can be widely used in air conditioning apparatuses in which the airflow rate setting of an indoor fan can be manually instructed.

What is claimed is:

1. An air conditioning apparatus comprising:
an outdoor unit;
an indoor unit having an indoor heat exchanger and an indoor fan, with an airflow rate setting of the indoor fan being capable of being manually instructed by a remote controller; and
a control unit configured to
control the airflow rate of the indoor fan based on the airflow rate setting of the indoor fan that has been manually instructed by the remote controller in a first control unless the manually instructed airflow rate setting is higher than an upper limit of the airflow rate of the indoor fan determined in accordance with an outside air temperature, and
carry out a second control to forcibly limit the airflow rate setting of the indoor fan to be nearer to a low airflow rate in accordance with the outside air temperature so as to automatically override the airflow rate setting of the indoor fan that has been manually instructed by the remote controller,
the control unit being further configured to
determine if the second control is started based on a predetermined threshold value of the outside air temperature,
in the second control,
the upper limit of the airflow rate of the indoor fan being modified in accordance with the outside air temperature,
when the manually instructed airflow rate setting becomes a higher airflow rate than the airflow rate upper limit by modifying the airflow rate upper limit, the manually instructed airflow rate setting being reduced to the airflow rate upper limit, and
when the manually instructed airflow rate setting is equal to or less than the airflow rate upper limit even if the airflow rate upper limit is modified, then the manually instructed airflow rate setting being maintained.

2. The air conditioning apparatus according to claim 1, wherein
the control unit is further configured to carry out at least one of
a process in which the upper limit of the airflow rate of the indoor fan is reduced in accordance with a decrease in the outside air temperature during an air-cooling operation, and
a process in which the upper limit of the airflow rate of the indoor fan is reduced in accordance with an increase in the outside air temperature during an air-warming operation.

3. The air conditioning apparatus according to claim 2, wherein
the limitation of the airflow rate setting of the indoor fan to be nearer to the low airflow rate is relaxed when indoor temperature diverges from a target indoor temperature.

4. The air conditioning apparatus according to claim 1, wherein
the limitation of the airflow rate setting of the indoor fan to be nearer to the low airflow rate is relaxed when indoor temperature diverges from a target indoor temperature.

5. An air conditioning apparatus comprising:
an outdoor unit;
an indoor unit having an indoor heat exchanger and an indoor fan, with an airflow rate setting of the indoor fan being capable of being manually instructed by a remote controller; and
a control unit configured to
control the airflow rate of the indoor fan based on the airflow rate setting of the indoor fan that has been manually instructed by the remote controller in a first control unless the manually instructed airflow rate setting is higher than an upper limit of the airflow rate of the indoor fan determined in accordance with an outside air temperature, and
carry out a second control to forcibly limit the airflow rate setting of the indoor fan to be nearer to a low airflow rate in accordance with the outside air temperature so as to automatically override the airflow rate setting of the indoor fan that has been manually instructed by the remote controller,
the control unit being further configured to
determine if the second control is started based on a predetermined threshold value of the outside air temperature,
the outdoor unit or the indoor unit having an indoor flow rate regulation valve useable to regulate a flow rate of a refrigerant that flows through the indoor heat exchanger, and
the second control being carried out when a valve opening of the indoor flow rate regulation valve is equal to or less than a permitted valve opening to limit the airflow rate.

6. The air conditioning apparatus according to claim 5, wherein
the control unit is further configured to carry out at least one of
a process in which the upper limit of the airflow rate of the indoor fan is reduced in accordance with a decrease in the outside air temperature during an air-cooling operation, and
a process in which the upper limit of the airflow rate of the indoor fan is reduced in accordance with an increase in the outside air temperature during an air-warming operation.

7. The air conditioning apparatus according to claim 6, wherein
the limitation of the airflow rate setting of the indoor fan to be nearer to the low airflow rate is relaxed when indoor temperature diverges from a target indoor temperature.

8. The air conditioning apparatus according to claim 5, wherein
the limitation of the airflow rate setting of the indoor fan to be nearer to the low airflow rate is relaxed when indoor temperature diverges from a target indoor temperature.

* * * * *